(12) United States Patent
Heller, Jr. et al.

(10) Patent No.: US 7,484,043 B2
(45) Date of Patent: Jan. 27, 2009

(54) MULTIPROCESSOR SYSTEM WITH DYNAMIC CACHE COHERENCY REGIONS

(75) Inventors: Thomas J. Heller, Jr., Rhinebeck, NY (US); Richard I. Baum, Austin, TX (US); Michael Ignatowski, Red Hook, NY (US); James W. Rymarczyk, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 10/603,251

(22) Filed: Jun. 25, 2003

(65) Prior Publication Data

US 2004/0268044 A1    Dec. 30, 2004

(51) Int. Cl.
*G06F 12/00* (2006.01)
(52) U.S. Cl. .................. 711/141; 711/129; 711/153; 711/154; 711/173; 718/104
(58) Field of Classification Search ............... 711/141
See application file for complete search history.

(56) References Cited

U.S. PATENT DOCUMENTS

| | | | | |
|---|---|---|---|---|
| 5,781,757 | A * | 7/1998 | Deshpande | 711/146 |
| 5,852,716 | A * | 12/1998 | Hagersten | 709/201 |
| 5,860,114 | A * | 1/1999 | Sell | 711/146 |
| 6,631,447 | B1 * | 10/2003 | Morioka et al. | 711/141 |
| 7,003,633 | B2 * | 2/2006 | Glasco | 711/146 |
| 2003/0018739 | A1 * | 1/2003 | Cypher et al. | 709/213 |

OTHER PUBLICATIONS

"Logical Partition Security in the IBM eSERVER pSeries 690", Feb. 15, 2002, IBM. http://www-03.ibm.com/servers/eserver/pseries/hardware/whitepapers/lpar_security.pdf.*
Written Opinion of the International Searching Authority, PCT/EP2004/050878, WIPO, Dec. 25, 2005.*

* cited by examiner

*Primary Examiner*—Kevin L Ellis
*Assistant Examiner*—Kalpit Parikh
(74) *Attorney, Agent, or Firm*—Lynn L. Augspurger

(57) ABSTRACT

A multiprocessor computer system has a plurality of processing nodes which use processor state information to determine which coherent caches in the system are required to examine a coherency transaction produced by a single originating processor's storage request. A node of the computer has dynamic coherency boundaries such that the hardware uses only a subset of the total processors in a large system for a single workload at any specific point in time and can optimize the cache coherency as the supervisor software or firmware expands and contracts the number of processors which are being used to run any single workload. Multiple instances of a node can be connected with a second level controller to create a large multiprocessor system. The node controller uses the mode bits to determine which processors must receive any given transaction that is received by the node controller. The second level controller uses the mode bits to determine which nodes must receive any given transaction that is received by the second level controller. Logical partitions are mapped to allowable physical processors. Cache coherence regions which encompass subsets of the total number of processors and caches in the system are chosen for their physical proximity. A distinct cache coherency region can be defined for each partition using a a hypervisor.

19 Claims, 6 Drawing Sheets

| Originating Processor | Mode Bit Setting | Node Controller Action: Transmit Transaction to the following processors and/or second level controllers: |
|---|---|---|
| P0 | "000" | Do not forward transaction |
| P0 | "001" | Processor P1 |
| P0 | "010" | All Processors in originating node. |
| P0 | "1xx" | All Processors in originating node and second level controllers |
| P1 | "000" | Do not forward transaction |
| P1 | "001" | Processor P0 |
| P1 | "010" | All Processors in originating node. |
| P1 | "1xx" | All Processors in originating node and second level controller |
| P2 | "000" | Do not forward transaction |
| P2 | "001" | Processor P3 |
| P2 | "010" | All Processors in originating node. |
| P2 | "1xx" | All Processors in originating node and second level controllers |
| P3 | "000" | Do not forward transaction |
| P3 | "001" | Processor P2 |
| P3 | "010" | All Processors in originating node. |
| P3 | "1xx" | All Processors in originating node and second level controllers |

"1xx" is used to describe a 1 in the first bit position and any combination of bit in the second and third bit positions.

FIGURE 4.

| Originating Node | Mode Bit Setting | Second Level Controller Action: Transmit transaction to the following nodes: |
|---|---|---|
| 0 | "0xx" | Not Applicable |
| 0 | "101" | Node 1 |
| 0 | "111" | All Nodes |
| 1 | "0xx" | Not Applicable |
| 1 | "101" | Node 0 |
| 1 | "111" | All Nodes |
| 2 | "0xx" | Not Applicable |
| 2 | "101" | Node 3 |
| 2 | "111" | All Nodes |
| 3 | "0xx" | Not Applicable |
| 3 | "101" | Node 2 |
| 3 | "111" | All Nodes |

FIGURE 5.

| Partition ID | Coherency Mode | Processors Allowed for Dispatch (Node:Processors) | |
|---|---|---|---|
| 0 | "000" | (0:P2) | |
| 1 | "000" | (1:P1) | |
| 2 | "001" | (2:P0)(2:P1) | |
| 3 | "010" | (3:P0)(3:P1)(3:P2)(3:P3) | |
| 4 | "010" | (0:P0)(0:P1)(0:P2)(0:P3) | |
| 5 | "101" | (2:P0)(2:P1)(2:P2)(2:P3) (3:P0)(3:P1)(3:P2)(3:P3) | |
| 6 | "111" | Any processor on any of the 4 nodes | |

FIGURE 6.

MULTIPROCESSOR SYSTEM WITH DYNAMIC CACHE COHERENCY REGIONS

FIELD OF THE INVENTION

This invention relates to a multiprocessor computer system having a plurality of nodes and particularly to one which uses processor state information to determine which coherent caches in the system are require examination during the processing of a coherency transaction produced by a single originating processor's storage request.

RELATED APPLICATIONS

This invention is related to an application entitled: Multiprocessor computer system having multiple coherency regions and software process migration between coherency regions without cache purges U.S. Ser. No. 10/603,252, filed Jun. 25, 2003, filed concurrently herewith and assigned to the same assignee.

This co-pending application and the present application are owned by one and the same assignee, International Business Machines Corporation of Armonk, N.Y.

The description set forth in these co-pending application is hereby incorporated into the present application by this reference.

Trademarks: IBM® is a registered trademark of International Business Machines Corporation, Armonk, N.Y., U.S.A. Other names may be registered trademarks or product names of International Business Machines Corporation or other companies.

BACKGROUND OF THE INVENTION

The idle time spent by computer processors while waiting for memory references to complete has become a much larger fraction of the total execution time for a wide variety of important commercial and technical computing workloads. Many prior-art techniques have been used in multiprocessor system designs to minimize the time a processor must wait while the access of main storage locations is completed. These techniques fall broadly into two categories. The first category of techniques attempts to find additional instructions for the processors to execute while waiting for the memory reference which is experiencing a delay. These techniques include such hardware and software mechanisms as out of order execution and multithreading. The second category of techniques focuses on minimizing the latency of the memory reference itself, e.g. SRAM caches, DRAM caches and high speed multiprocessor bus architectures. SRAM and DRAM caches have been extremely successful in reducing memory reference latency and one or both are used by all current multiprocessor designs. Prior-art cache designs include specialized hardware and software which maintain cache coherence for multiprocessor systems. For systems which connect a plurality of processors via a shared bus, a snoop bus protocol is typically employed. Each coherent transaction performed upon the shared bus is examined (or "snooped") against data in the caches of all other devices attached to the bus. If a copy of the affected data is found, the state of the cache line containing the data may be updated in response to the coherent transaction.

Although caches have worked well for multiprocessor systems with a moderate number of processors, prior-art multiprocessor designs do not scale well when extended to large numbers of processors for many important workloads including the transaction and database workload simulated by the TPC-C benchmark.

Logical partitioning, as described in U.S. Pat. No. 4,843, 541, when using shared processors also causes poor scaling for prior-art system designs-when extended to large numbers of processors. U.S. Pat. No. 4,843,541 shows how a virtual machine hypervisor program can be used to "partition the resources in a central electronic complex of a data processing system into a plurality of logical partitions". Logical partitioning is widely used on large multiprocessor systems to run many workloads that operate on private data simultaneously. In a typical system employing logical partitioning, an operating system instance is initialized within each logical partition. The logical partition can have from 1 to n logical processors. The hypervisor is responsible to dispatch each of the logical processors onto a physical processor. If a physical processor is the host of just a single logical processor over a long period of time it is said to be "dedicated" to that logical processor's partition. If a physical processor is the host of the logical processors from multiple partitions it is said to be a "shared" processor. It is desirable, from an overall hardware utilization point of view, for a large multiprocessor system to allow the flexibility of defining many or most of the physical processors as "shared" and allowing the movement of logical processors among the physical processors of the multiprocessor as the utilization of the physical processors fluctuates with external changes. Prior-art multiprocessor cache designs do not scale well for these partitioned workloads, especially when the physical processors are defined as "shared".

A large factor in the poor performance scaling of large multiprocessors for both the large single database workload and the shared logical partition case is the relationship between increasing numbers of processors and the time delay required to communicate among them. Snoop bus protocols require memory references that miss local caches to be broadcast to all caches which may contain a copy of the requested lines, typically all other caches in the system. The bus bandwidth required to distribute the addresses and responses for large multiprocessor systems is very high. The need to provide the required high bandwidth has driven prior-art designs to use switch chips with many wide ports, expensive chip carriers to provide the needed pins, expensive card technology to provide good electrical characteristics and therefore high speed buses, expensive card connectors to provide wide buses etc. The cost of all these elements has become a significant problem when trying to improve the cost/performance of large multiprocessor systems.

Prior-art designs have attempted to solve these two problems, coherency operation latency and address bandwidth limitations, in many different ways but each has imposed other costs on the system design which the current invention seeks to avoid.

Large shared caches, as exemplified in the IBM S/390 G4 design (IBM Journal of Research and Development Volume 41, Numbers 4&5, 1997) have been used in prior-art designs to address both problems. The interconnection of a few large shared caches does provide good latency for requests which hit in the shared cache. The inclusive shared cache also acts as a filter which eliminates the need to broadcast addresses to all of the processors in the system for some cases. The design does not scale well to large numbers of processors. The use of additional processors drives the design to using large multi-chip modules with many wiring layers and L2 cache chips with an extremely large number of I/O required to provide a port for each of the processors connected.

Multiprocessor systems which rely on directories to track the access of local memory by remote requesters, as exemplified by the Sequent NUMA-Q design ("STiNG: A CC-NUMA Computer System for the Commercial Marketplace", in Proc. 23rd International Symposium of Computer Architecture, May 1996) work to reduce the address bandwidth required for large numbers of processors. They do so at the expense of large RAM directories and an increase in protocol complexity and hardware support. This type of design also depends upon an assumption that the majority of the main storage lines referenced by a particular software process is located on the same physical node as the node that the processor that is executing the workload is currently dispatched on. There are severe performance penalties for cases where a workload is accessing a large number of remote lines since the number of lines that can be "checked out" by remote nodes is limited by the size of the NUMA directories. One goal of the current invention is to allow the movement of the execution of a workload quickly and easily among many processors without the need to move main storage contents and without significant performance degradation.

Hagersten et al., U.S. Pat. No. 5,852,716 describes the use of multiple address partitions in order to define cache coherent operations which are either "local" and confined to a subset of processors in a large multiprocessor or "global" and therefore broadcast to all processors. A local transaction in Hagersten is defined as one which has physical memory allocated to the same subset of processing nodes as the subset to which the processor which originates the storage request belongs. The description beginning on in 63 of column 7 of U.S. Pat. No. 5,852,716 makes it clear that this prior-art invention does not allow the movement of a process between what is referred to as "local domains" without either moving the physical storage associated with that process or by changing the addressing mode to "global".

We have determined that there is a need for techniques to reduce transmission of address requests between various processors in a multiprocessor computer system without using large amounts of SRAM directory and without requiring the movement of main storage contents. In developing solutions for fulfilling this need we have determined that there is an associated need to reduce the latency of all storage reference transactions in large multiprocessor systems.

SUMMARY OF THE INVENTION

In fulfilling these determined needs, we have software and/or firmware to define which subset of processors in a large multiprocessor must participate in a coherency transaction independent of which processing node is connected to the physical DRAM storage being requested. The preferrred embodiment of our invention works to allow the movement of a process between nodes of a large multiprocessor without moving physical storage contents and without requiring subsequent broadcasting of the storage references, originated by the process, to all of the caches in the multiprocessor. The preferred embodiment of our invention is embodied in a multiprocessor computer system having a plurality of nodes and which uses processor state information to determine which coherent caches in the system are required to examine a coherency transaction produced by a single originating processor's storage request.

Our invention reduces the number of caches in a multiprocessor system that must be examined during a cache coherency transaction and therefore reduces the time and address bandwidth required to complete the transaction. Still, the computer system of the preferred embodiment the ability to quickly and easily move workload among the physical processors in the system. The reduction in the number of caches involved in any single transaction allows systems using the invention to complete cache coherency operations much faster than prior-art designs for some types of storage requests which are common in important workloads.

The preferred embodiment of the multiprocessor system which has multiple and many processors provides "cache coherence regions" which encompass subsets of the total number of processors and caches in the system. The cache coherence regions are chosen for their physical proximity. The physical proximity allows for a hardware system design which has low latency for coherence operations which are confined to cache coherence regions which have fewer processors than the total number of processors in the system.

The hardware uses only a subset of the total processors in a large system for a single workload at any specific point in time and can optimize the cache coherency as the supervisor software or firmware expands and contracts the number of processors which are being used to run any single workload. The preferred embodiment of the invention is in a system which uses logical partitioning. Each partition operates on its own address space and therefore a distinct cache coherency region can be defined for each partition. The preferred embodiment of the current invention uses such a hypervisor. While this partitioned system is our preferred embodiment, an alternative embodiment of many features of the invention can work with a single operating system or application.

By defining multiple cache coherent regions, the invention allows more independent workloads to coexist on the same hardware as compared to prior-art designs. Although the invention is well suited for use in a system whose hardware and software supports logical partitioning of a multiprocessor system, it should be understood that the invention can also be used in systems which don't have such hardware and software support. Any software or firmware which can identify separate processes which have instruction streams that operate on independent main storage locations can use the invention.

The preferred embodiment of our invention uses cache coherence mode bits to eliminate the need for some coherency transaction broadcasts. The mode bits are appended to a processor's storage transactions when they are transmitted on the bus network connecting the processors of a multiprocessor system. The cache coherency controls are designed such that the mode bits are used in the decision of whether the storage request must be transmitted to additional processors in the system.

The advantages of the invention are numerous. One advantage of the invention is that it allows an increase in the effective utilization of the address bandwidth of the buses used to interconnect the processors of a multiprocessor system. A second advantage is that the invention allows easy movement of workload among physical processors in a multiprocessor system at the same time as reducing the address bandwidth required to maintain cache coherency among all the processors.

These and other improvements are set forth in the following detailed description. For a better understanding of the invention with advantages and features, refer to the description and to the drawings.

DESCRIPTION OF THE DRAWINGS

FIG. 4 illustrates a table that describes how the node controller uses the mode bits to determine which processors must receive any given transaction that is received by the node controller.

FIG. 5 shows a table that describes how the second level controller uses the mode bits to determine which nodes must receive any given transaction that is received by the second level controller.

FIG. 6 shows one possible mapping of logical partitions to allowable physical processors.

Our detailed description explains the preferred embodiments of our invention, together with advantages and features, by way of example with reference to the drawings.

DETAILED DESCRIPTION OF THE INVENTION

Figure 1:
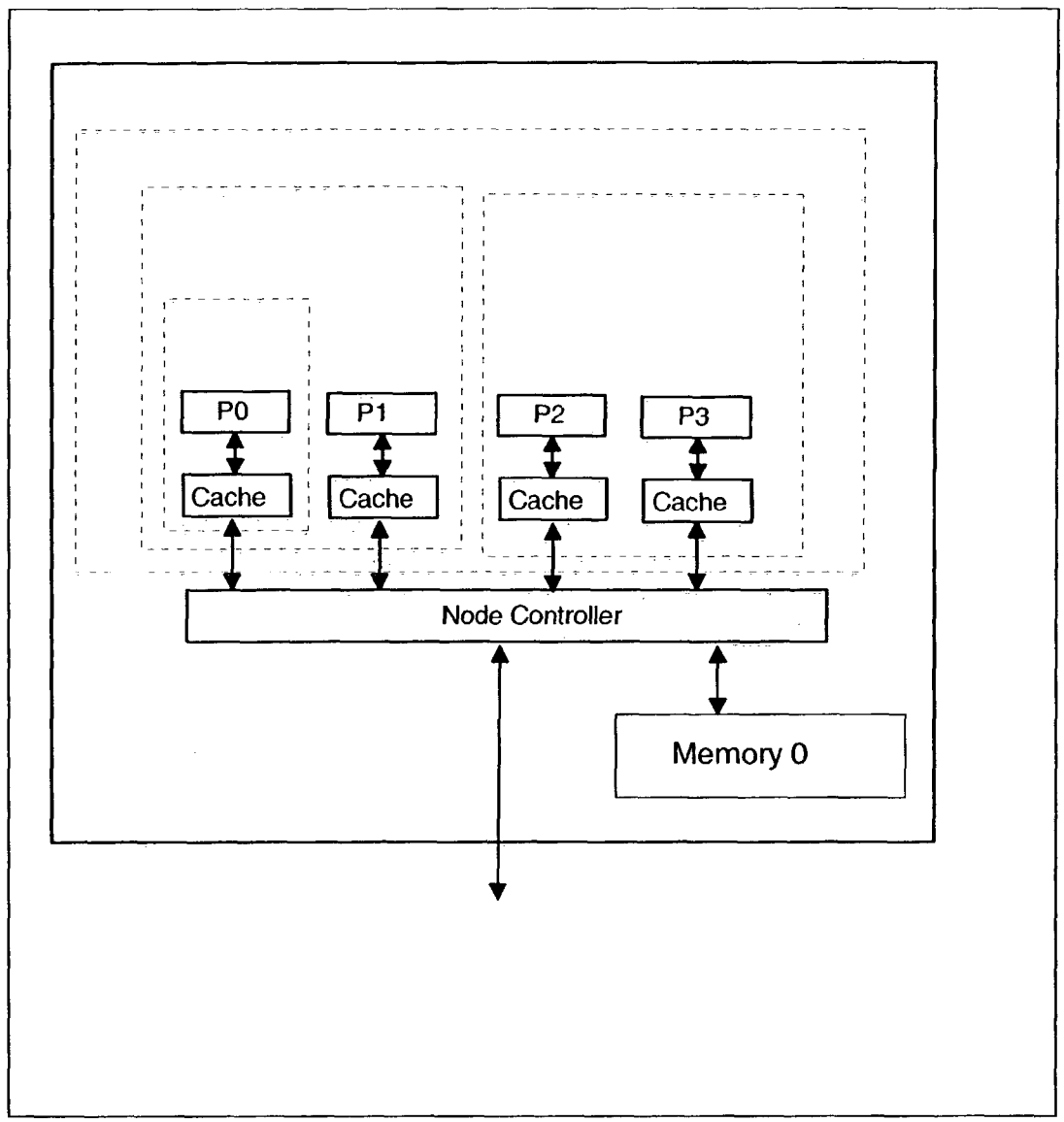
FIG. 1 illustrates a block diagram of one embodiment of one node of a computer with dynamic coherency boundaries.
Figure 2:
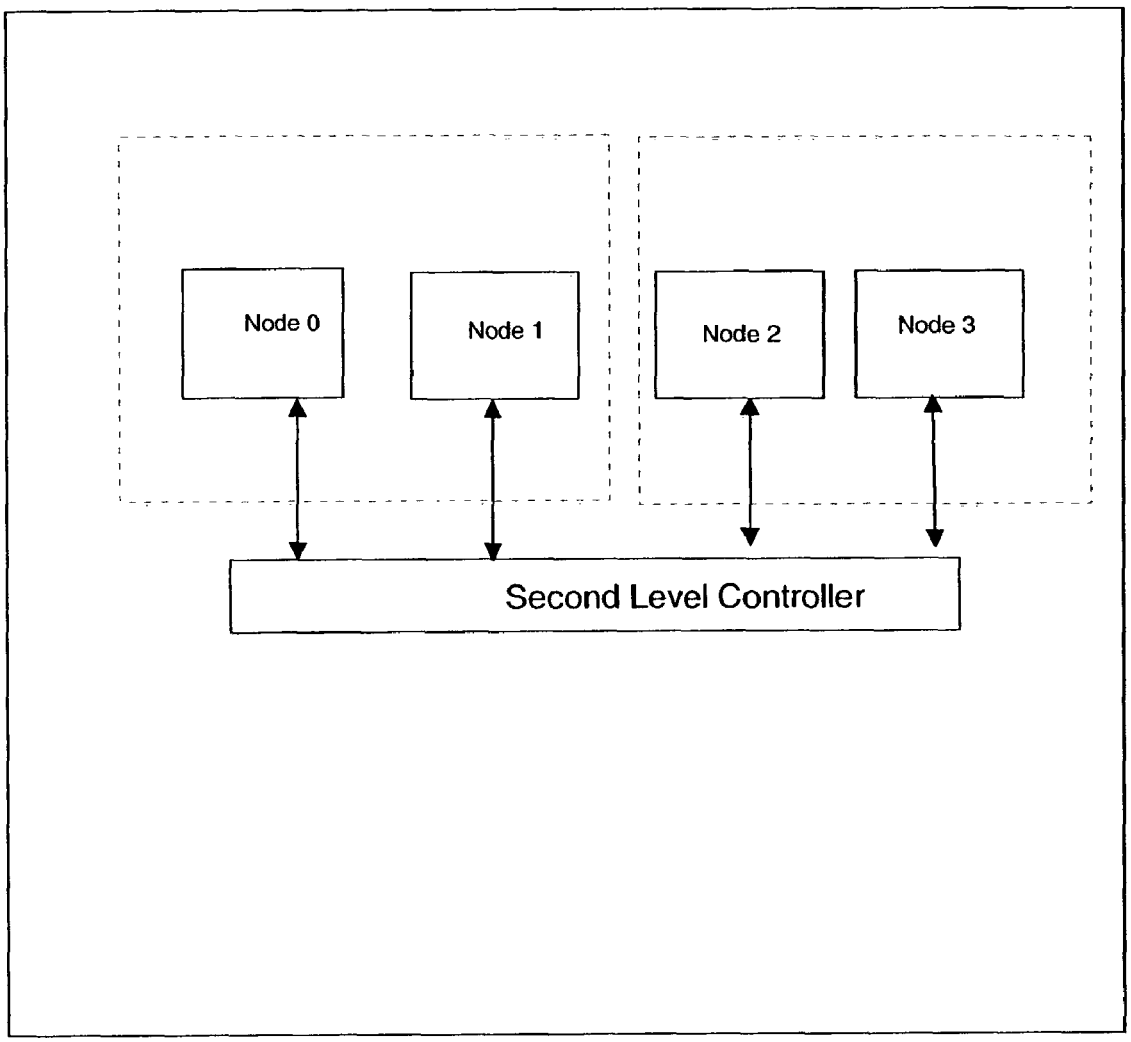
FIG. 2 shows how multiple instances of node of the computer from FIG. 1 can be connected with a second level controller to create a large multiprocessor system.

Turning now to FIG. 1, a block diagram of one embodiment of one node (10) of a computer with dynamic coherency boundaries is shown. FIG. 1 shows a plurality of processors P0-P3, each with a cache, attached to a local node controller (11). The local controller connects multiple processors together with a DRAM main storage element (12). Storage transactions that are initiated by a single processor are transmitted to the node controller which may in turn transmit the transaction to any or all of the other processors in the node. The node controller may also transmit the transaction on bus (13) to other parts of the computing system which contains additional processors (not shown). FIG. 2 shows how multiple instances of node (10) from FIG. 1 can be connected with a second level controller (15) to create a large multiprocessor system. FIG. 1 shows the use of 4 processing elements but it should be understood that any number of processing elements could be used. FIG. 1 shows only 1 memory element but it should be understood that any number of memory elements could be used. The preferred embodiment uses the hierarchical bus organization shown in FIGS. 1 and 2, but the invention can be applied to multiprocessor systems that use any other type of interconnect topology.

Figure 3:
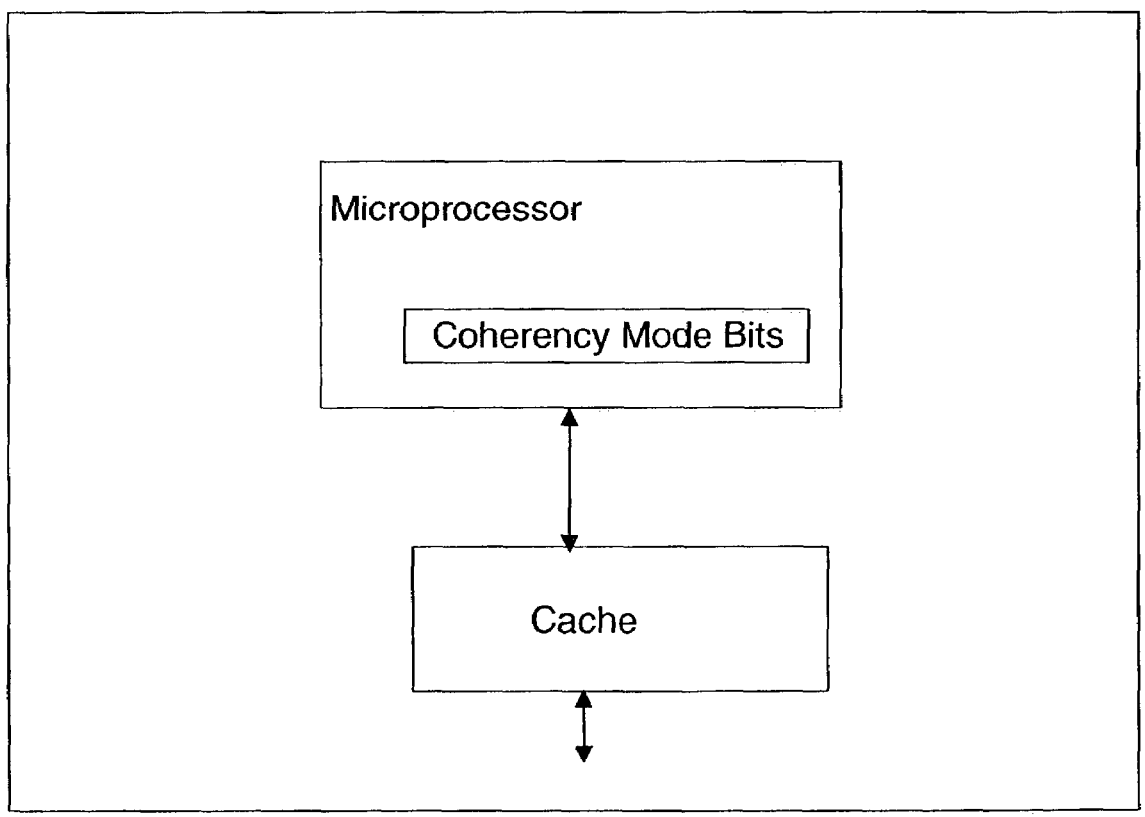
FIG. 3 shows a single processing element from FIG. 1.

FIG. 3 shows a single processing element from FIG. 1. The invention uses one or more coherency mode bits (16) for each processor in the multiprocessor system. The coherency mode bits associated with a processor are sent together with each storage transaction that is initiated by that processor when the transaction is transmitted to the node controller via bus (17) on FIG. 3. It should be understood that a node controller is used in this embodiment but could be replaced with a simple physical bus in other embodiments. The cache coherency hardware in node controller (11) and second level controller (15) use the mode bits associated with each transaction to determine which caches must participate in any storage transactions that they receive from any of the processors. The preferred embodiment uses 3 mode bits. The 3 mode bits are used together to identify the following modes of operation for the node controller and secondary controller. A coherency mode setting of "000" is used to define a coherency region of just a single processor as shown by dashed lines (10') in FIG. 1. Any of the other 3 processors could be used in a single processor coherency region also. A coherency mode setting of "001" is used to define a coherency region of two processors as shown by dashed lines (18) and (19) in FIG. 1. The current embodiment allows the hypervisor to define two-processor coherency regions that cover either (P0 and P1) or (P2 and P3) in order to simplify the hardware controls required in the node controller. Other embodiments could allow other combinations, such as P0 from node 1 and P0 from node 2. A coherency mode setting of "010" is used to define a coherency region that includes all of the processors of a single node as shown by dashed line (20) in FIG. 1. A setting of "101" defines a coherency region that includes two nodes as shown by dashed lines (21) and (22) in FIG. 2. Finally, a processor with a setting of "111" indicates that all storage transactions generated must be sent to all the caches in the entire system.

The coherency mode setting is considered part of the state of a logical partition and therefore part of the state of the logical processors which are defined in that partition. In the current embodiment, all logical processors from a single logical partition have the same coherency mode setting at a single point in time. It should be understood that additional software or firmware could be used to define processes within a single partition which use an isolated set of storage addresses and therefore could be provided a different coherency mode setting and a different set of allowable physical processors to be used for dispatch. When a logical processor is dispatched onto a physical single processor the physical processor temporarily takes on the coherency mode setting of the logical processor. The coherency mode bits are sent with all storage transactions generated by the processor when they are transmitted to the node controller (11). Since many logical partitions can be defined and used at once, many different and overlapping coherency regions are used at the same time. The current invention provides hardware and firmware controls in the node controller (11) and second level controller (15) which use the coherency mode bits that accompany each bus transaction to determine how to route the transaction over the buses which interconnect the processors in the system.

FIG. 4 shows a table that describes how the node controller uses the mode bits to determine which processors must receive any given transaction that is received by the node controller. FIG. 5 shows a table that describes how the second level controller uses the mode bits to determine which nodes must receive any given transaction that is received by the second level controller. FIG. 6 shows one possible mapping of logical partitions to allowable physical processors. In the current embodiment, the node controller will forward all transactions received from the secondary node controller to all the processors connected to the node controller. It should be understood that there are many other potential coherency boundaries that could be established which would require the node controller to transmit requests which come from the second level node controller to just a subset of processors connected to the second level node controller.

The mode bits for each logical processor are set by hypervisor software. It should be understood that the bits could alternatively be set by suitable hardware or firmware controls. Since the coherency mode bits control which processors will be included in the broadcast of any transaction, the hypervisor software must carefully control the setting and changing of the mode bits to maintain accurate cache coherency. Our preferred embodiment adds additional function to a prior-art software hypervisor to perform the function of setting the mode bits. A hypervisor divides the physical memory resource of a computing system into 2 or more partitions. The hypervisor insures that there is no overlap between the main storage addresses of the multiple partitions. The current invention requires that the hypervisor assign a coherency mode setting to each of the logical partitions in the system. The hypervisor must insure that the value of the setting is used when determining which physical processors can be used to host the logical processors from that logical partition. The decision of whether a physical processor can be used to host a specific logical processor involves both the prior setting of the mode bits and the set of processors that have hosted the partition since the last change of the mode bits. FIG. 6 shows one potential mapping of logical partitions and physical processors. The hypervisor must keep a software image of this type of mapping to insure cache coherency when using the current invention. As shown in FIG. 6, partition 5 has been established with coherency mode "101". Mode "101" represents a coherency region of two nodes and the initial setting has been chosen to use node 2 and node 3.

A careful examination of the table in FIG. 6 shows that processor 0 of node 2 and processor 1 of node 2 can be used to host logical processors from either partition 2 or partition 5. When the hypervisor chooses to dispatch a new logical processor on a physical processor it must always consult a software table like FIG. 6 and properly set the coherency mode bits of the physical processor with the settings associated with the partition to be dispatched. This setting of the coherency mode bits must happen before the first storage reference of the newly dispatched logical processor.

The hypervisor may change either the coherency mode bit settings associated with a logical partition or the allowable physical processors associated with a partition or both. A change in the allowable physical processors must follow the following procedure. Partition 0 in FIG. 6 is shown to have a coherency mode setting of "000". It is also shown in FIG. 6 that partition 0 can only be dispatched on processor 2 of node 0. If the hypervisor needs to move the dispatching of logical partition 0 to some other processor in the system which is not currently included in the coherency boundary established for that partition, then it must first stop dispatching all logical processors from that logical partition. Second, the hypervisor must initiate a purge of the caches of processor 2 node 0 (this could be a selective purge based on the logical partition ID if the hardware supports selective purges). Third, the hypervisor must update the software table shown in FIG. 6 to include the new allowable physical processors, in this case processor 3 of node 3. Finally it can begin to dispatch the logical processors of partition 0 on processor 3 of node 3.

The hypervisor may change coherency mode bits for a specific logical partition in order to increase then number of physical processors that can be used or to decrease the number of processors and therefore reduce the total system address bandwidth consumed by that partition. Changing to a mode which increases the number of physical processors, from "000" to "001" for example, only requires that the hypervisor stop dispatching the logical processors for the partition and change the mode in table 6. Partition 0 could be changed from "000" to "001" which would change the allowable logical processors from just processor 2 of node 0 to both processor 2 of node 0 and processor 3 of node 0. Changing to a mode which decreases the number of physical processors must include a cache purge operation on the physical processors which are being eliminated from the allowable processor list in table 6. For example, if the coherency mode bits for logical partition 2 shown in table 6 are changed from "001" to "000" and processor 1 of node 2 is removed from the allowable list, the following steps must be taken. The hypervisor must stop dispatching any logical processors from partition 2. The hypervisor must initiate a purging of the caches on processor 1 of node 2. The hypervisor must update table 6 to reflect the new coherency mode bit setting of "000" and the new allowable processor entry of just processor 0 of node 2. After completing these steps, the hypervisor can begin dispatching the logical processors of partition 2 on physical processor 0 of node 2. When the mode bits are set to "000" the node controller does not transmit the transaction to any additional processors or nodes.

Although our preferred embodiment uses a hypervisor, it should be understood that any hardware, firmware or software mechanism which can provide the required function could be used to control the setting of the coherency mode registers.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A multiprocessor computer system comprising,
a cache coherent symmetric (SMP) computer system of symmetric multiple processors having a plurality of processing nodes and caches and a node controller which use processor state information according to mappings provided by supervisor software or firmware of allowable physical processors to an application workload to determine which coherent cache regions in the system are required to examine a coherency transaction produced by a storage request of a single originating processor of said computer system and to change coherency boundaries of one or more of said coherent cache regions directly with coherency mode bits for said coherent cache regions, and wherein a control program for the dispatch of virtual processors for controlling the size and extent of a required coherency domain changes said coherency boundaries directly with said coherency mode bits.

2. The multiprocessor computer system according to claim 1 wherein a node of said plurality of processing nodes of the computer has dynamic coherency boundaries such that hardware of said computer system uses only a subset of the processors in said computer system for a single workload at any specific point in time and optimizes the cache coherency as the supervisor software or firmware expands and contracts the number of processors which are being used to run any single workload.

3. The multiprocessor computer system according to claim 1 wherein multiple instances of a physical node are connected with a second level controller to create a multiprocessor system having multiple node controllers.

4. The multiprocessor computer system according to claim 1 wherein said node controller uses mode bits to determine which processors must receive any given transaction that is received by the node controller.

5. The multiprocessor computer system according to claim 1 wherein a second level controller is provided which uses mode bits to determine which nodes must receive any given transaction that is received by the second level controller.

6. The multiprocessor computer system according to claim 1 wherein logical partitions are provided and mapping of said logical partitions to allowable physical processors is provided by supervisor software or firmware of allowable physical processors to an application workload.

7. The multiprocessor computer system according to claim 1 wherein logical partitions are provided for the supervisor software or firmware which maps allowable physical processors to an application workload and a hypervisor assigns cache coherence regions which encompass subsets of said processors and caches in the system chosen for their physical proximity and defines a distinct cache coherency region for each of said logical partitions.

8. The multiprocessor computer system according to claim 1 wherein a single workload uses only a subset of the total processors in the computer system for a single workload at any specific point in time for an assigned partition and a distinct cache coherency for the address space of the assigned partition as the supervisor software or firmware expands and contracts the number of processors which are being used to run any single workload in said assigned partition.

9. The multiprocessor computer system according to claim 1 wherein a single workload uses only a subset of the total processors in the computer system for a single workload at any specific point in time, and multiple cache coherent regions are assigned for different partitions as more independent workloads coexist on said hardware.

10. The multiprocessor computer system according to claim 1 wherein cache coherence regions encompass subsets of processors and caches in the computer system and a single workload uses only a subset of the total processors in the computer system for a single workload at any specific point in time for an assigned partition and a distinct cache coherency for the address space of the assigned partition as the supervisor software or firmware expands and contracts the number of processors which are being used to run any single workload in said assigned partition.

11. The multiprocessor computer system according to claim 1 wherein software and/or firmware define which subset of processors in said multiprocessor must participate in a coherency transaction independent of which processing node is connected to physical DRAM storage being requested by said single originating processor.

12. The multiprocessor computer system according to claim 11 wherein the movement of a process between nodes of said symmetric multiple processors of said multiprocessor is effectuated without moving physical storage contents and without requiring subsequent broadcasting of the storage references originated by the process from said single originating processor's storage request to all of the caches in the multiprocessor.

13. The multiprocessor computer system according to claim 1 wherein cache coherence mode bits are appended to a processor's storage transactions when transmitted to a connected processor of said multiprocessor computer system.

14. The multiprocessor computer system according to claim 13 wherein said cache coherence mode bits are used in a decision determining whether the single originating processor's storage request must be transmitted to additional processors in the system.

15. The multiprocessor computer system according to claim 14 wherein an increase in the effective utilization of the address bandwidth of the buses used to interconnect the processors of a multiprocessor system allows movement of workload among physical processors in a multiprocessor system at the same time as a reduction of the address bandwidth required to maintain cache coherency among all the processors is caused.

16. A method of managing cache coherence of a computer system, comprising:
 providing a plurality of logical partitions which are defined based upon computing environment requirements,
 defining a plurality of coherent cache regions,
 mapping logical partitions to said coherent cache regions, and
 determining coherency mode bits for each partitions and writing said coherency mode bits to a state of said partitions, and
 associating said coherency mode bits with a partition be dispatched by hypervisor dispatch, and
 changing coherency boundaries of one or more of said coherent cache regions directly with coherency mode bits for said coherent cache regions, and
 wherein a control program for the dispatch of virtual processors for controlling the size and extent of a required coherency domain changes said coherency boundaries directly with said coherency mode bits.

17. The method according to claim 16 wherein said coherency boundaries for one or more of said logical portions are changed after a need for a change occurs due to system or workload requirements.

18. The method according to claim 16 wherein a partition has it matching changed when cache coherency regions are to be added by changing coherency mode bits for that partition to include a larger region.

19. The method according to claim 16 wherein if a coherency region does not include all nodes of an old regions, then said hypervisor dispatch is stopped, and caches of nodes are selectively purged and coherency mode bits for the partition are changed and then normal hypervisor dispatch is resumed.

* * * * *